United States Patent [19]

Hooper

[11] Patent Number: 5,576,030

[45] Date of Patent: Nov. 19, 1996

[54] APPARATUS FOR FABRICATING COMPOSITE PARTS

[75] Inventor: James R. Hooper, Palmdale, Calif.

[73] Assignee: Lockheed Corporation, Westlake Village, Calif.

[21] Appl. No.: 537,381

[22] Filed: Oct. 2, 1995

[51] Int. Cl.$^6$ .............. B29C 70/44; B29C 70/48
[52] U.S. Cl. .......... 425/112; 264/257; 264/316; 264/510; 264/571; 425/389; 425/405.1
[58] Field of Search .................. 425/112, 389, 425/390, 405.1, DIG. 44; 264/257, 258, 313, 316, 510, 571

[56] References Cited

U.S. PATENT DOCUMENTS

| | | | |
|---|---|---|---|
| 2,913,036 | 11/1959 | Smith | 264/102 |
| 4,132,755 | 1/1979 | Johnson | 264/553 |
| 4,622,091 | 11/1986 | Letterman | 264/510 |
| 4,816,106 | 3/1989 | Turris et al. | 264/510 |
| 4,902,215 | 2/1990 | Seemann, III | 425/389 |
| 4,942,013 | 7/1990 | Palmer et al. | 264/257 |
| 5,281,388 | 1/1994 | Palmer et al. | 264/257 |

FOREIGN PATENT DOCUMENTS

| | | |
|---|---|---|
| 60-83826 | 5/1985 | Japan . |
| 944955 | 12/1963 | United Kingdom . |
| WO91/14564 | 10/1991 | WIPO .................. 425/405.1 |

*Primary Examiner*—Robert Davis
*Attorney, Agent, or Firm*—Louis L. Dachs

[57] ABSTRACT

The invention is an apparatus for forming fiber reinforced resin structures In detail, invention includes a fluid impervious outer first sheet. A mold surface is includes upon which can be supported a lay-up of at least one layer of fibrous material, and over which can be placed the first fluid impervious outer sheet and its edges marginally sealed upon the mold surface to form a chamber. A first vacuum port for drawing a vacuum upon the chamber is located in proximity to the lay-up. A first distribution medium is positioned between the fabric lay-up and the fluid impervious outer sheet for distributing resin into the lay-up. A second fluid impervious sheet is located between the first distribution medium and the first impervious sheet. A resin inlet port extends from the exterior of the chamber through the first and second impervious sheets an is in communication with the first distribution medium. A second distribution medium is located between the first and second impervious sheets for providing a flow path from the lay-up to the outlet port. A second vacuum port extends from the exterior of the first impervious sheet to the chamber and in communication with the second distribution medium.

8 Claims, 4 Drawing Sheets

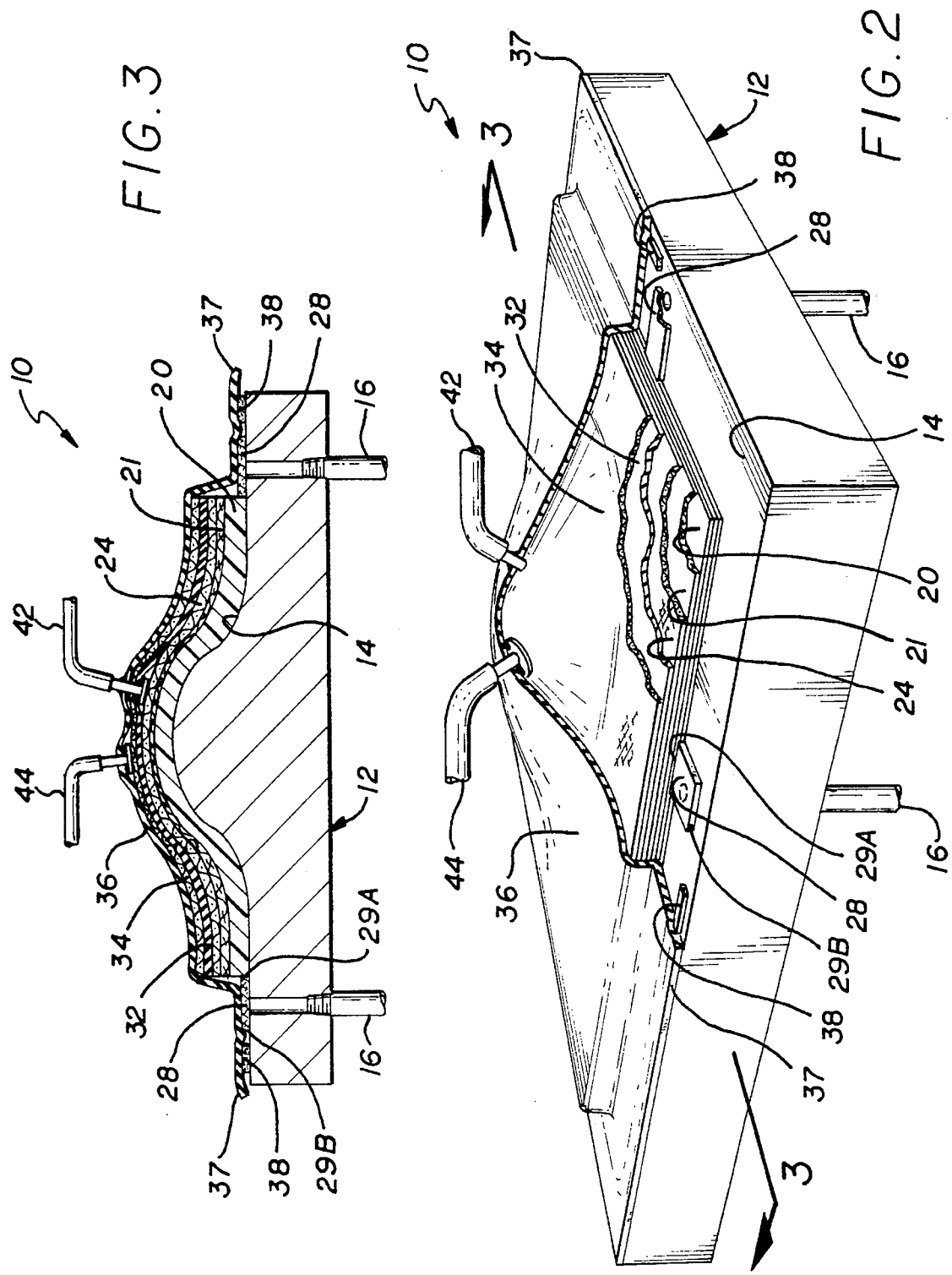

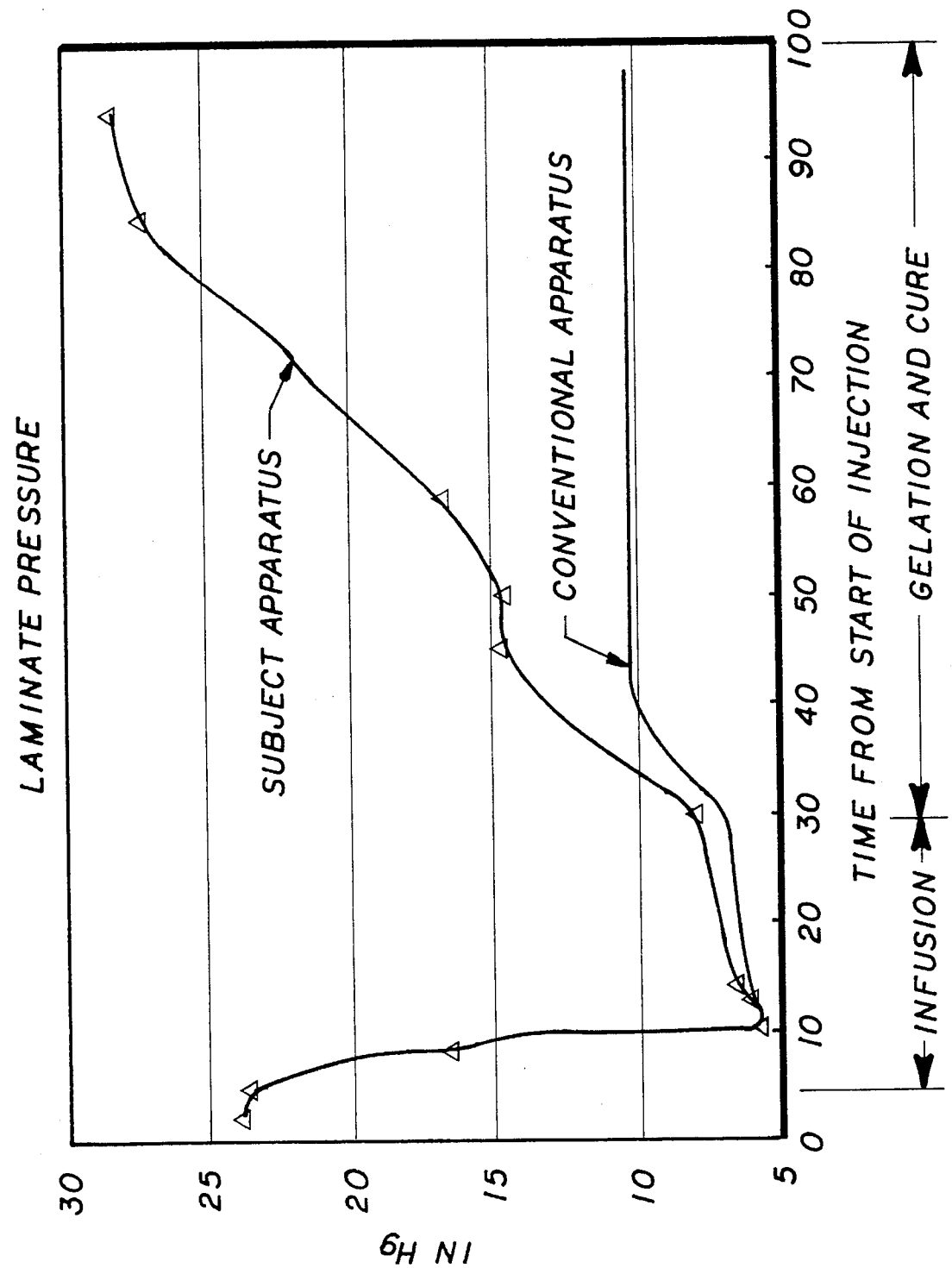

APPARATUS FOR FABRICATING COMPOSITE PARTS

BACKGROUND OF THE INVENTION

1. Field of the Invention

The invention relates to the field of apparatus and processes for the manufacture of composite parts or structures and, in particular, to the field of apparatus and processes for the manufacture of composite parts wherein resin is injected into a lay-up of fibrous materials positioned in a mold.

2. Description of Related Art

A typical method of manufacturing composite pads involves the steps of laying up structural filamentary material pre-impregnated with a resin in a mold, vacuum bagging the lay-up, drawing a vacuum from between the bag and mold such that the lay-up is compressed by atmospheric pressure against the mold while, and, finally, heating the resin impregnated filamentary material until the resin is cured. However, pre-impregnated filamentary material is expensive, its shelf life is limited, and it must normally be kept refrigerated until used. Additionally, the number of resin/filamentary material combinations is limited. Furthermore, special handling safety procedures are necessary when handling uncured resin impregnated materials.

This has led to the use of processes that do not require such "prepregs", as they are often called. These processes are similar in that structural filamentary material is still laid up in a mold, however it is resin free, the lay up is vacuum bagged, a vacuum is drawn from between the bag and mold such that the lay-up is compressed by atmospheric against the mold. However, in this process, resin is simultaneously drawn in through an inlet port in the vacuum bag and through the lay-up impregnating it. Finally, the now impregnated filamentary material is heated until the resin is cured. Such a process is essentially disclosed in British Patent No. 944,955 "Improvements In Or Relating To Methods Of Producing Reinforced Plastic Structures" by P. R. Green. Another approach is found in U.S. Pat. No. 2,913,036 "Process And Apparatus For Molding Large Plastic Structures" by G. H. Smith. Here the lay-up is placed over a mold. The lay-up itself incorporates a plurality of channels wherein resin can flow from the periphery of the lay-up upward to the center thereof. Thus after vacuum bagging, the resin is pumped into the lay-up from the periphery of the mold while a vacuum is pulled from a plurality of locations in the center.

This resin distribution problem was also addressed in U.S. Pat. No. 4,132,755 "Process For Manufacturing Resin Impregnated Reinforced Articles Without The Presence of Resin Fumes" by J. Johnson. This process includes the steps of placing the lay-up in a mold; placing a sheet of flexible material containing a plurality of dispersed perforations thereover and sealing its periphery to the mold so as to define a sealed inner chamber in which the lay-up is contained; placing a sheet of impervious flexible material (vacuum bag) over the sheet of perforated flexible material, with the periphery thereof also sealed to the mold so as to define a sealed outer chamber in which the inner chamber is contained, connecting the inner chamber to a vacuum source so as to draw the vacuum bag and perforated sheet, against the lay-up; and connecting the outer chamber to a source of resin so that the resin is passed from the outer chamber into the reinforcing material through the perforations of the first-mentioned sheet and into the lay-up.

Japanese patent no. 60-83826 contemplates the use of a woven plastic resin flow layer (No. 10 mesh) with a thickness of 1.05 mm to distribute the resin into the lay-up. In U.S. Pat. No. 4,902,215 "Plastic Transfer Molding Techniques For the Production of Fiber Reinforced Plastic Structures" By W. H. Seemann the apparatus includes a mold over which a fluid impervious outer sheet or vacuum bag, having a resin inlet port, that is marginally sealed to the mold forming a chamber in which the lay-up is placed for subsequent molding. A vacuum outlet port is provided for drawing a vacuum from the chamber. A resin distribution medium is positioned between the lay-up and vacuum bag. In one embodiment, the distribution medium is a sheet comprising an open network of non-swelling, non-resin absorbing intersecting monofilaments having pillar like members at the intersections. In a second embodiment, the distribution medium includes intersecting strips. In a third embodiment the distribution medium is a weaved or knitted plastic fabric. In addition, a distribution means or channel formed by incorporating a helical spring between the lay-up and vacuum bag extending from the resin inlet across the distribution medium, insures that the resin is evenly distributed. A vacuum is drawn via the outlet port and resin is drawn in through the inlet port. Drawing of the vacuum causes the vacuum bag to collapse down on the lay-up and form the lay-up against the mold. However, the resin distribution medium insures that the resin is distributed evenly over the lay-up by keeping the vacuum bag from collapsing onto the lay-up.

The inventor claims that due to its open pillar-like structure of the distribution medium and the continuous network of lateral openings lying between these pillars, a continuous network of passageways in all direction is provided from the point of entry of the resin, or fluid plastic, over the whole area of the distribution medium. In applicant's co-pending U.S. patent application Ser. No. 417,521 "Apparatus for Fabricating Composite Parts", filed Jun. 6, 1995 the use of resin distribution mediums made of woven or knitted wire mesh in an apparatus for forming such composite structures. The use of the high modulus materials prevents local collapse thereof and also acts as a caul plate further eliminating the possibility of resin starved areas.

All of these patents except those to Seemann did not address the need to insure that the "vacuum path" remains open so that it is equally drawn from all areas of the lay-up. Seemann's approach is to install a spiral spring between the lay-up and outlet port so that the vacuum bag can not collapse about the inlet to the port. However, such a spiral spring does little to insure that the vacuum is drawn evenly from the entire lay-up.

Thus it is a primary object of the subject invention to provide an apparatus and process for making composite parts.

It is another primary object of the subject invention to provide an apparatus and process for making composite parts using non-impregnated filamentary material..

It is a further object of the subject invention to provide an apparatus and process for making composite parts using non-impregnated filamentary material that includes a resin distribution medium that insures even resin distribution throughout the lay-up and, a distribution medium positioned over the lay-up to insure that a vacuum is drawn equally from all parts of the lay-up.

SUMMARY OF THE INVENTION

The invention is an apparatus and process for forming fiber reinforced resin structures. In detail, the apparatus includes a fluid impervious outer first sheet. A mold having a mold surface is provided upon which can be supported a lay-up of at least one layer of fibrous material, and over which can be placed the first fluid impervious outer sheet and its edges marginally sealed upon said mold surface to form a chamber. A first vacuum port for drawing a vacuum upon said chamber is located in proximity to the lay-up.

A first distribution medium is located between the fabric lay-up and the fluid impervious outer sheet for distributing resin into the lay-up. A second fluid impervious sheet is located between the first distribution medium and the first impervious sheet. A resin inlet port extends from the exterior of the chamber through the first and second impervious sheets and is in communication with the first distribution medium. A second distribution medium is located between the first and second impervious sheets for providing a flow path from the lay-up to the outlet port. A second vacuum port extends from the exterior of the first impervious sheet to the chamber and which is also in direct communication with the second distribution medium.

Normally, a porous peel ply is positioned over the lay-up to protect the completed part and which is removed when additional processing of the part is undertaken. Flat fibrous strips of material (fiber glass fabric) are positioned on the mold coupled to the lay-up and which extend beyond the second fluid impervious sheet to insure that a path remains open between the lay-up and the first vacuum port.

In operation, the first vacuum port of the assembled apparatus is connected to a vacuum pump and a vacuum is drawn from within the chamber causing the vacuum bag to compress about the lay-up. Resin is drawn in through the inlet port and is distributed throughout the first distribution medium into the lay-up. After the resin has completely infused into and through the lay-up, the resin inlet port is closed. Thereafter, the second vacuum port is opened such that a vacuum is drawn from the chamber through both vacuum pods. The apparatus is placed in an oven and the temperature thereof is raised to the curing temperature of the resin and remains there until the resin is cured. A vacuum is still drawn through the first and second vacuum pods so as to remove any gases produced by resin as it cures. The vacuum must also be drawn to eliminate the effect of any micro-leaks that may exist. The second distribution medium insures that a vacuum is drawn evenly from the lay-up and a good flow path is maintained insuring that a high differential pressure remains between the mold surface and the vacuum bag increasing the compaction pressure on the lay-up as it cures. Thereafter, the temperature is reduced to ambient and the apparatus is disassembled and the finished part is removed from the mold.

Thus the essential steps of the process for forming a fiber reinforced resin structure includes:

1. placing at least one layer of fibrous material over a mold surface;
2. placing the first fluid distribution medium over the lay-up;
3. placing the first fluid impervious inner sheet over the first fluid distribution medium;
4. placing the second fluid distribution medium over the first fluid impervious sheet;
5. placing the second fluid impervious sheet over the second distribution medium and sealing the marginal areas thereof to the mold surface forming a chamber;
6. drawing a vacuum from the chamber by means of the first vacuum port located in proximity to the lay-up;
7. infusing resin into the lay-up by means of an inlet port having an outlet communication with the first fluid distribution medium such that the resin is distributed throughout the first fluid distribution medium and into the lay-up;
8. terminating resin flow while continuing to draw a vacuum from the first vacuum ports after the lay-up has been infused with resin;
9. drawing a vacuum from a second vacuum port in communication with the second resin distribution medium; and
10. curing the resin infused into the lay-up.

The novel features which are believed to be characteristic of the invention, both as to its organization and method of operation, together with further objects and advantages thereof, will be better understood from the following description in connection with the accompanying drawings in which the presently preferred embodiment of the invention is illustrated by way of example. It is to be expressly understood, however, that the drawings are for purposes of illustration and description only and are not intended as a definition of the limits of the invention.

BRIEF DESCRIPTION OF THE DRAWINGS

FIG. 2 is a perspective view of the apparatus for molding composite parts and structures that incorporates the duel distribution mediums partially broken away to show the interior thereof.

FIG. 3 is cross-sectional side view of the apparatus for molding composite parts and structures that incorporates the duel distribution mediums shown in FIG. 2 taken along the line 3—3.

FIG. 6 is a graph level of the vacuum "pulled" on the lay-up as a function of time for both conventional forming apparatus and processes and the subject apparatus and process.

DESCRIPTION OF THE PREFERRED EMBODIMENT

Figure 1:
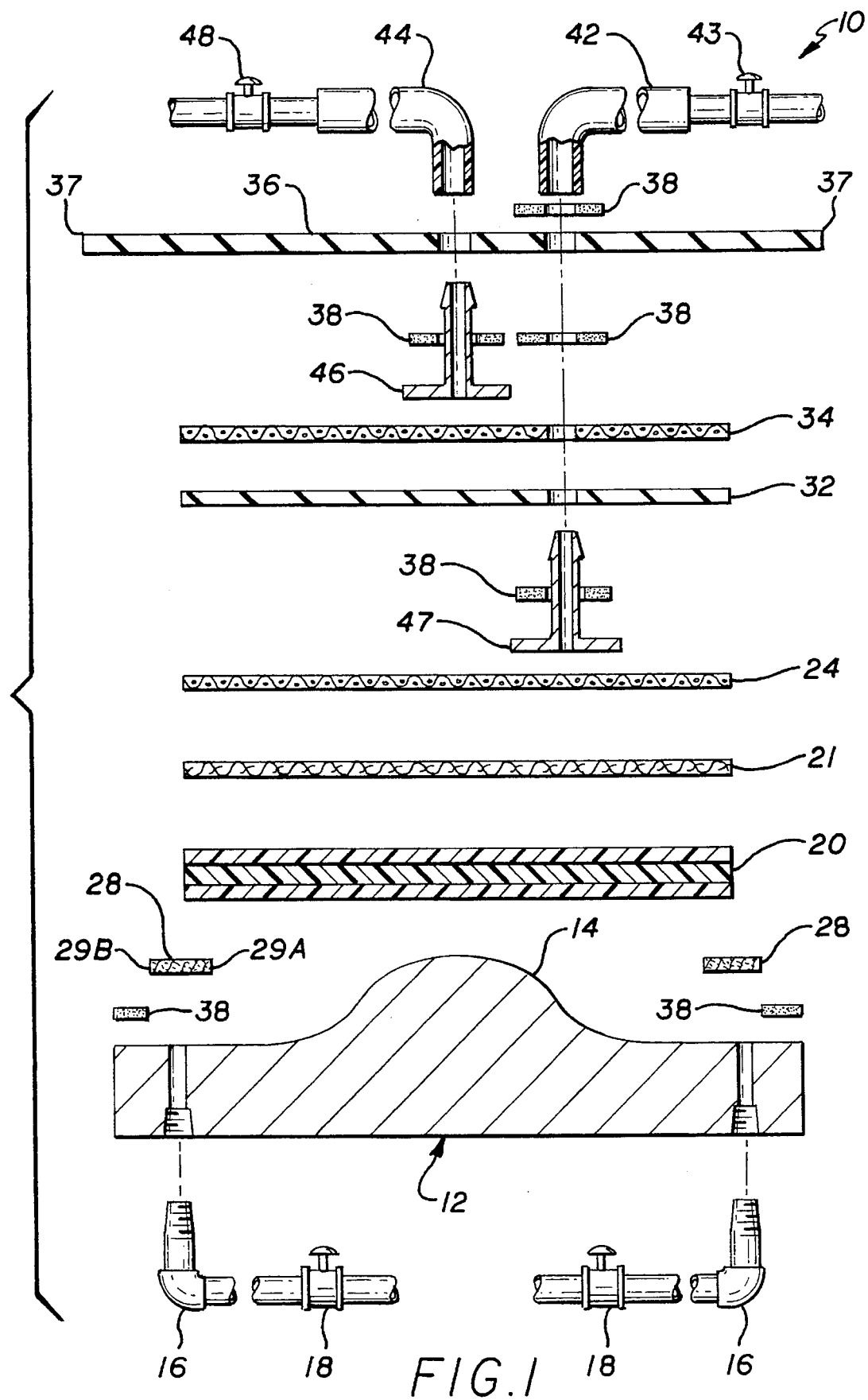
FIG. 1 is an exploded side view of the apparatus for molding composite parts and structures that incorporates dual distribution mediums.
Figure 4:
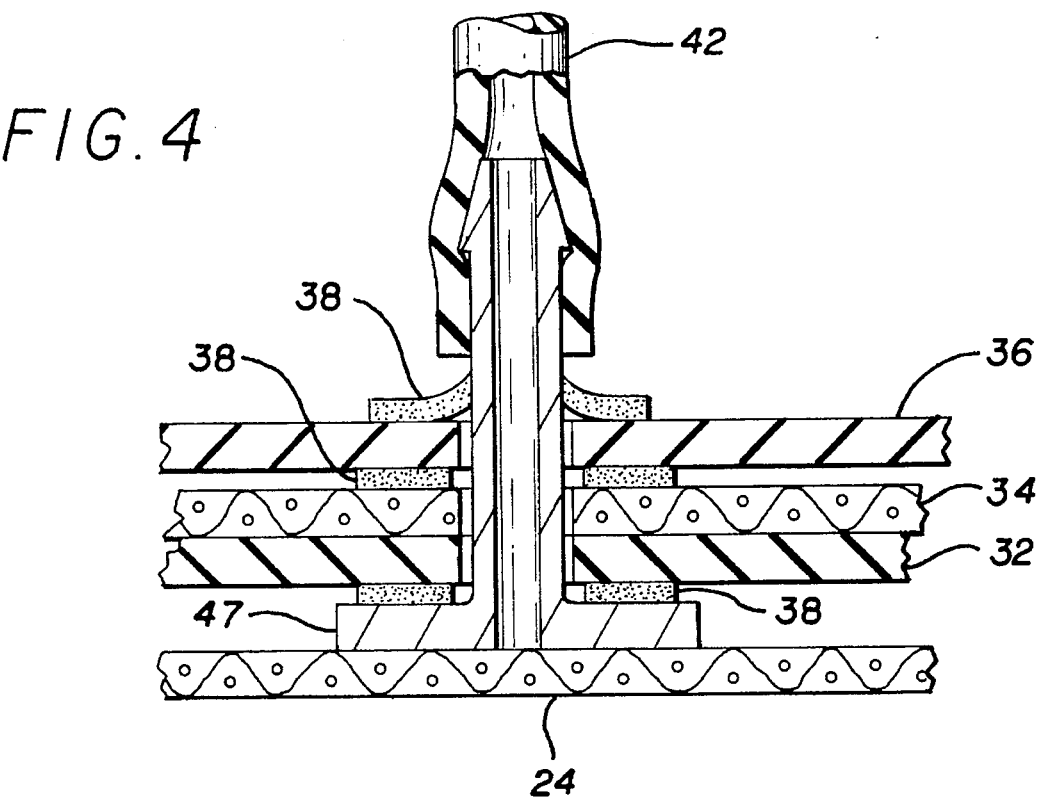
FIG. 4 is a enlarged partial view of FIG. 1 illustrating the fitting used to install the resin inlet port.

Referring to FIGS. 1 through 4, the apparatus for forming composite parts, generally indicated by numeral 10, includes a mold 12 having a forming surface 14. A plurality of first vacuum ports 16 extend from the mold surface 14 through the mold 12 and couple to a vacuum pump (not shown). Each of the ports incorporate a control valve 18. A lay-up 20, made up of one or more layers of fibrous materials, is placed over the mold forming surface 14. The typical lay-up is made up of a multi-number of layers of such filamentary material with the filaments in each layer at different angles to each other. Typical filamentary materials are fiberglass, graphite. KEVLAR™ manufactured by the E. I. du Pont De Nemours and Co, Wilminton, Del. There are, of course, numerous other filamentary materials that can be used. A porous peel ply 21, typically porous Nylon taffeta or TEFLON™ coated fiberglass, is positioned over the lay-up.

A first distribution medium in the form of at least one layer of mesh screen sheet 24 is placed over the peel ply 21, which acts to distribute a resin over the entire lay-up. The sheet 24 can be a metal wire mesh screen, similar to those disclosed in applicants co-pending U.S. patent application Ser. No. 417,521 "An Apparatus For Making Composite Structures", filed Jun. 6, 1995, herein incorporated by reference. Of course, such plastic distribution mediums, similar to those disclosed in U.S. Pat. No. 4,902,215 "Plastic Transfer Molding Techniques For the Production of Fiber Reinforced Plastic Structures" By W. H. Seemann can also be used. Which ever type is used, it should have an area generally equal to the area of the lay-up 20.

Strips of fibrous mat material 28 are positioned on the mold 12 having first ends 29A in contact with the lay-up 20 and second ends 29B that over lap the ports 16 in the mold 12. Preferably, this material is fiberglass fabric. An impervious flexible sheet 32, for example, a thin sheet of silicon rubber, is positioned over the distribution medium 24 and should be larger in size. A second distribution medium in the form of a sheet 34 is positioned over the sheet 32, again having an area generally equal to the area of the lay-up 20. The sheet 34 can be similar in construction to the sheet 24. However, because only entrapped air or gases produced during curing will be transmitted therethrough, the second distribution can be made of much finer mesh screen material, in fact even fibrous materials may be used. An impervious sheet 36, generally referred to as "vacuum bag" is placed over the second sheet 34 and sealed by its marginal edges 37 to the mold surface 14 by means of a sealing tape 38 forming a sealed chamber 40. This vacuum bag 36 can also be made of silicon rubber. A resin inlet port 42, having a control valve 43 mounted therein is coupled to a fitting 47 that extends through the vacuum bag 36, through the resin distribution medium 34, and terminates in the impervious sheet 32 such that it is in communication with the sheet. It is sealed to the bag 36 and sheet 32 by means of sealing tape 38 A vacuum port 44 is also coupled to a fitting 46 mounted to the sheet 36 located in the center thereof and in communication with the sheet 34 and is sealed thereto by sealing tape 38. The second vacuum port 44 also includes a control valve 48 mounted therein that is coupled to vacuum pump (not shown).

Figure 5:
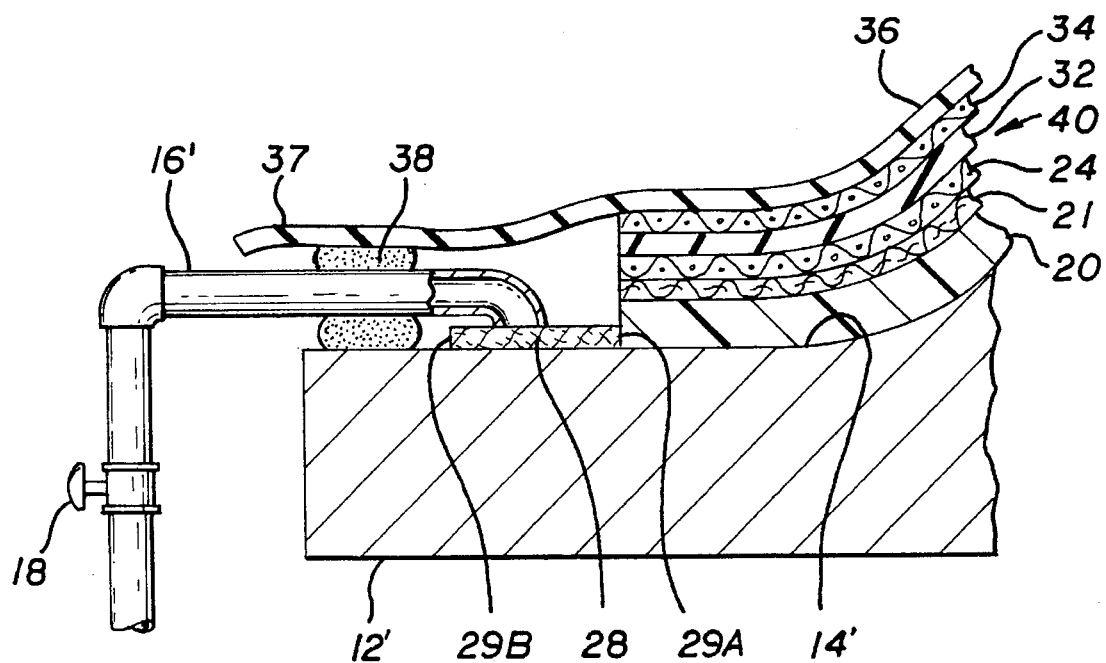
FIG. 5 is a partial view of FIG. 3 illustrating an alternate installation of a vacuum port for drawing a vacuum on the lay-up.

In FIG. 5, an alternate installation of first vacuum pods, indicated by numeral 16', is illustrated. Here the ports 16' are inserted between the mold surface 14' of the mold 12' and the marginal edges 37 of the vacuum bag 36 and are in contact with the ends 29B of the strips of fiberglass mat 28. The sealing tape 38, in this version, is also used to seal the periphery of the port 16'.

Referring to FIGS. 1–4, in operation, after the apparatus 10 is assembled, the valve 18 in the vacuum port 16 is opened and the valve 48 in the vacuum port 44 is closed. The valve 43 in the resin inlet port 42 is opened and resin is pumped in, while a vacuum is "pulled" from the port 16. This causes the resin to be drawn into the sheet 24 where the resin is distributed over and through the peel ply 21 and into the lay-up 20. Simultaneously, air within the chamber 40, and, particularly, lay-up 20, is withdrawn causing the vacuum bag 36 to compress the lay-up against the mold surface 14. Indication of complete resin infusion of the lay-up 24 is indicated when resin is observed in the strips of fiberglass mat 38 through the vacuum bag 36, or appears in the vacuum port 16. Thereafter, the valve 43 in the resin inlet port 42 is closed. Simultaneously, or close thereto, the valve 48 in the vacuum port 44 is opened and a vacuum is drawn therefrom. The apparatus 10 is thereafter placed in an oven (not shown) and the temperature is raised to the curing temperature of the resin and remains there until the resin has cured. Thereafter, the temperature is reduced to 4 ambient and the apparatus 10 is disassembled and the finished part is removed from the mold 12. The peel ply 21 insures that after curing of the resin, the sheet 24 can be easily removed.

In general, there are a wide variety of resins that can be used; however a viscosity of less than 500 centi-poise is recommended to insure that complete resin infusion of the lay-up occurs. An example of a suitable resin is epoxy resin No. 242A/D manufactured by Blue Max Products, Corona, Calif.

Therefore, the essential steps of the process for forming a fiber reinforced resin structure include:
1. placing the lay-up 20 on the surface 14 of the mold 12;
2. placing the sheet 24 over the lay-up 20;
3. placing the first fluid impervious sheet 32 over the first fluid distribution medium 24;
4. placing the sheet 34 over the first fluid impervious sheet 32;
5. placing the second fluid impervious sheet 36 over the sheet 34 and sealing the marginal areas 37 thereof to the mold surface 14, forming the chamber 40;
6. drawing a vacuum from the chamber 40 by means of the first vacuum port 16 located in proximity to the lay-up 20;
7. injecting resin by means of the inlet port 42 having an outlet in communication with the sheet 24 such that the resin is distributed throughout the first sheet 24 and into the lay-up 20;
8. terminating resin flow through the inlet port 42 after the lay-up 20 has been infused with resin while continuing to draw a vacuum from port 16;
9. drawing a vacuum from the second vacuum port 44 in communication with the second distribution medium 34; and
10. curing the resin infused lay-up 20 while drawing the vacuum from the second vacuum port.

The use of screen 34 as the distribution medium insures that the vacuum drawn from the lay-up 20 during the curing of the resin remains at a very high level, much higher than would be achieved if the vacuum where continued to be drawn in the conventional way, through the vacuum port 16 or the vacuum port 44 without the use of a distribution medium in the form of sheet 34. This can be seen in the graph presented in FIG. 6 which plots the level of vacuum drawn on the lay-up as a function of time from the point of resin injection to completion of the cure cycle. Note that in both cases, the vacuum level drops as resin is injected. However, as the cure cycle begins, the subject apparatus and process provides for a significantly higher vacuum level to be drawn on the lay-up. This insures higher compacting pressures and better extraction of gases produced during the cure cycle.

Further insuring the high compaction pressures are achieved is the use of the of two vacuum ports. If the vacuum port 44 were used to "out gas" the lay-up 20, resin would be drawn up into the sheet 34 essentially clogging it up, causing a reduction in compaction pressure. Thus the two vacuum ports are essential. The result is that parts are produced by this apparatus and process that are substantially equal to those obtained using an expensive autoclave wherein the compaction pressure can be raised well above atmospheric.

While the invention has been described with reference to a particular embodiment, it should be understood that the embodiment is merely illustrative as there are numerous variations and modifications which may be made by those skilled in the art. Thus, the invention is to be construed as being limited only by the spirit and scope of the appended claims.

Industrial Applicability

The invention has applicability to industries manufacturing parts and structures from composite materials; for example the aircraft industry.

I claim:

1. An apparatus for forming fiber reinforced resin structures including:
  a fluid impervious outer first sheet;
    a mold surface upon which can be supported a lay-up of at least one layer of fibrous material, and over which can be placed said first fluid impervious outer sheet and its edges marginally sealed upon said mold surface to form a chamber;
  a first vacuum port for drawing a vacuum upon said chamber, said first port located in proximity to said lay-up
    a first distribution medium for location between said fabric lay-up and said fluid impervious outer sheet for distributing resin into said lay-up;
  a second fluid impervious sheet for location between said first distribution medium and said first impervious sheet;
    a resin inlet port extending from the exterior of said chamber through said first and second impervious sheets and in communication with said first distribution medium;
  a second distribution medium for location between said first and second impervious sheets for providing a flow path from said lay-up to said outlet port, and
    a second vacuum port extending from said exterior of said first impervious sheet to said chamber and in communication with said second distribution medium.

2. The apparatus as set forth in claim 1 wherein said distribution mediums are wire mesh screens.

3. The apparatus as set forth in claim 2 further comprising
  a plurality of fibrous mat strips positioned on said mold having one end in contact with said lay-up and a second end extending beyond the periphery of said second impervious sheet; and
  said first vacuum ports in direct communication with said fibrous mat strips.

4. The apparatus as set forth in claim 3 wherein said first and second impervious sheets are flexible.

5. The apparatus as set forth in claim 4 wherein said first and second distribution means are flexible sheets.

6. The apparatus as set forth in claim 5 wherein said second vacuum port is located in the center of said second distribution.

7. The apparatus as set forth in claim 6 wherein said first vacuum port extends through said mold.

8. The apparatus as set forth in claim 6 wherein said first vacuum port is located between said mold and said marginal areas of said first impervious sheet.

* * * * *